United States Patent [19]

Kim et al.

[11] Patent Number: 5,088,579
[45] Date of Patent: Feb. 18, 1992

[54] OIL PICKUP STRUCTURE OF A COMPRESSOR

[75] Inventors: Ki M. Kim, Suweon; Gyu D. Kim, Pusan, both of Rep. of Korea

[73] Assignee: SamSung Electronics Co., Ltd., Suwon, Rep. of Korea

[21] Appl. No.: 550,512

[22] Filed: Jul. 10, 1990

[30] Foreign Application Priority Data

Sep. 26, 1989 [KR] Rep. of Korea ............ 89-14010

[51] Int. Cl.$^5$ .................................. F01M 1/00
[52] U.S. Cl. .................. 184/6.16; 417/368; 417/372
[58] Field of Search ............ 184/6.16, 6.18, 6.23, 184/96; 417/368, 372; 415/88, 70

[56]  References Cited

U.S. PATENT DOCUMENTS 2,766,929 10/1956 Rusch et al. .................. 417/372
3,858,685 1/1975 Bono .......................... 184/6.16

FOREIGN PATENT DOCUMENTS

0125377 9/1980 Japan ........................... 417/368
1023018 3/1966 United Kingdom ............... 184/6.16

Primary Examiner—James C. Yeung
Assistant Examiner—Alan B. Cariaso
Attorney, Agent, or Firm—Robert E. Bushnell

[57] ABSTRACT

An oil pickup structure of a compressor is constituted by a lubricant supplying apparatus of the tube type placed somewhat slantly at the end of the crank shaft, in which the tube has the cross-section with the same size throughout its over all length, at least one means for separating the refrigerating gas from the tube and discharging therefrom, and a projecting member mounted at the middle portion of the tube with being spaced away from said gas separating/discharging means so as to reduce the noise by the lubricant.

19 Claims, 5 Drawing Sheets

OIL PICKUP STRUCTURE OF A COMPRESSOR

BACKGROUND OF THE INVENTION

The invention is related to providing a lubricating apparatus, and particularly to providing an oil pickup structure for a compressor for smoothly supplying lubricant to the connecting portion.

A conventional oil pickup structure includes an apparatus connected slantly to the rotating shaft of the compressor so as to supply the lubricant to the supporting area of the rotating shaft by the centrifugal force during operation. That is, a conventional apparatus could not avoid the deterioration of its performance in a compressor due to the refrigerating gas discharged during the supply of the lubricant since the refrigerating gas is inherently contained in the lubricating oil.

Figure 1:
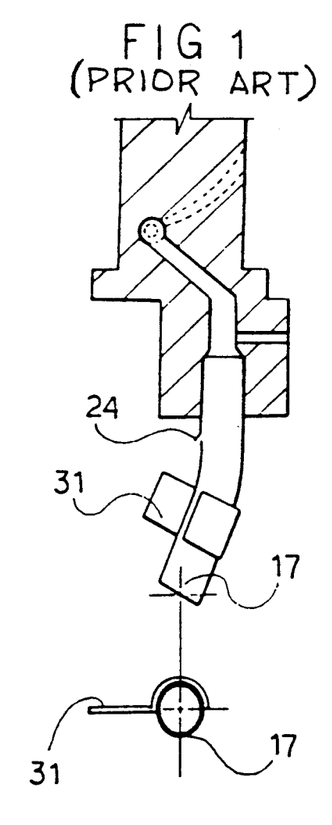
FIG. 1, FIG. 2 and FIG. 3A are schematical views representing embodiments of the prior art.

In light of this point, an oil pickup structure has been developed in a way that, as shown in FIG. 1, small hole 24 is formed on the upper of tube 17. But, it is difficult to discharge the refrigerating gas introduced with the lubricant through the hole. Due to it, a roaring noise is generated. Further, if the shape of the tube has been made in the lower bending configuration whose rotating radius is large, the pumping force is decreased since a large amount of bubbles is generated, thereby delaying the pumping time. Herein the lubricant is dispersed by the vane portion 31 which is arranged in the lower portion of the tube 17, represents a the roaring noise.

Figure 2:
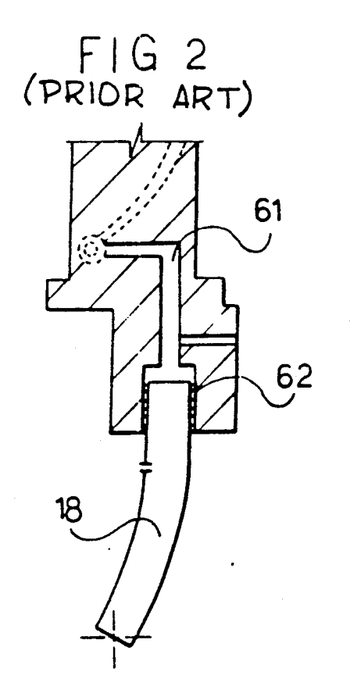

FIG. 2 represents a configuration similar to that of FIG. 1. Herein an oil pickup structure decreases the noise caused by the supporting portion of the rotating shaft since the refrigerating gas is moved upward through the tube 18 and discharged through the chip hole 62, but the pumping time of the lubricant is prolonged due to the flowing resistance generated by curving the lubricant passage 61 by 90 degree.

Figure 3A:
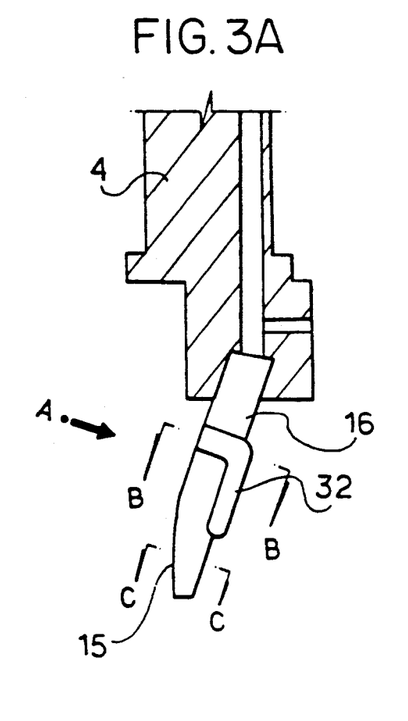
Figure 3B:
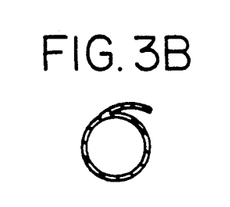
FIG. 3B is a cross-sectional view of line B—B of FIG. 3.
Figure 3C:
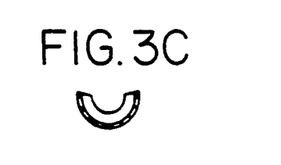
FIG. 3C is a cross-sectional view of line C—C of FIG. 3.

In order to resolve these problems, a lubricating device of FIG. 3 has been developed and disclosed in detail in U.S. Pat. No. 3,858,658 incorporated herein by reference. This apparatus, used in a compressor of a vertical axis 4 for a refrigerator, includes a upper part with a circular section and FIG. 3B and A lower part whose end section has a spiral shape FIG. 3C linked with a circular section of the upper part of the tube 16, FIG. 4 by means of rectilinear generatrices. The tube 16 also has a longitudinal fissure 15 and a paddle 32 fixed to its central parts. The tube 16 is placed in a slanting position at the end of the crankshaft of the compressor and rotates therewith to pump oil from the sump to the parts feeding lubrication while separating particles of refrigerating gas from the oil at the same time. Therefore, a large amount of the gas as well as the oil is intaken through the fissure of the lower part having a relatively larger area than that of the upper into the tube. It has the defect that abnormal noise is generated between the crank shaft ad the bearing, since the intaken gas can not be smoothly discharged through the fissure of the upper part narrower than that of the lower part out of the tube 16.

Figure 4:
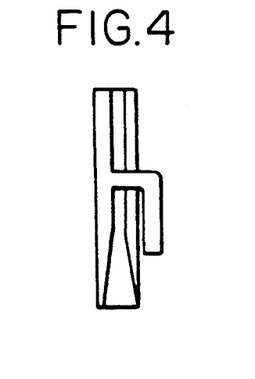
FIG. 4 is a detail view representing the portion A of FIG. 3.

On the contrary, if the lower part of the tube 16 is being narrowed and the upper portion is widen, it has an advantage that the intaken gas can be smoothly discharged through the fissure of the upper part, but it has disadvantages that a little amount of the oil is intaken through a relatively smaller fissure of the lower part and the pumping force is reduced due to a relatively larger fissure 15 of the upper part. Also, a paddle 32 is rotated while inserted into the lubricant. It generates bubbles reducing the possibility of the oil transmitting noise through the tube to the compressor. But, a paddle 32 immersed in the refrigerating oil functions to scatter the oil, with the result that noise is generated due to the falling of drops of the oil.

SUMMARY OF THE INVENTION

Accordingly, the invention is to provide an oil pickup structure of a compressor for resolving the above problems.

The other object of the invention is to provide an oil pickup structure of a compressor provided with a tube having at least one fissure of two types which are formed throughout the length of the tube to discharge the refrigerating gas therethrough with a predetermined portion of the tube being immersed into the lubricant.

Another object of the invention is to provide an oil pickup structure of a compressor provided with a vane portion formed to be spaced at a predetermined gap from the tube and to cover the fissure to block the lubricant moving upward along the circumference of the tube.

The invention relates to an oil pickup structure of a compressor which is constituted by a lubricant supplying apparatus of the tube type placed somewhat slantly at the end of the crank shaft, in which the tube has a cross-section with the same size throughout its over all length, at least one means for separating the refrigerating gas from the tube and discharging therefrom, and a projecting member mounted at the middle portion of the tube with being spaced away from said gas separating/discharging means so as to reduce the noise of the falling of drops of the lubricant.

Therefore, the invention comprises an oil pickup structure which the separating/discharging means has a uniform slit to discharge the refrigerating gas throughout the full length of the tube, and doesn't allow the refrigerating gas to reach the crank shaft, thereby reducing the mechanical noise. Also, the separating/discharging means formed on the lower part of the tube is made relatively smaller in order no to introduce the refrigerating gas therein, thereby enhancing the pumping force of a compressor.

Furthermore, the projecting member at the middle of the tube doesn't have a part immersed into the lubricant, so that it prevents the scattering of the lubricant, thereby removing the noise caused by the falling of drops of lubricant, and preventing the formation of the bubbles, thereby increasing the pumping force of a compressor.

BRIEF DESCRIPTION OF THE DRAWINGS

The invention will be described in detail with reference to the accompany drawings.

DETAIL DESCRIPTION OF THE INVENTION

Figure 5:
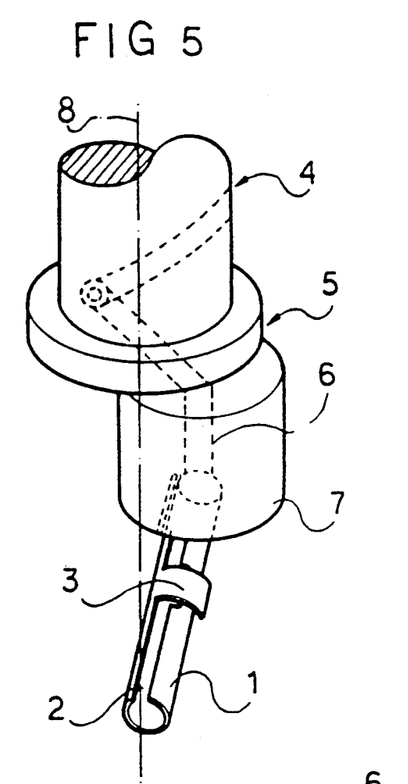
FIG. 5 is a schematical view representing an oil pickup of the invention.

Referring to FIG. 5, shaft 4 is a vertical shaft of a compressor used in a condenser. Shaft 4 ends below with crank shaft 5 and knob 7. Inside and in an axial position to knob 7, to crank shaft 5 and shaft 4 there runs oil passage 6 for the lubricant, marked with the exterior near knob 7 and shaft 4 so as to convey to oil sucked from the lubricant respectively to lubricate the couplings of crankshaft knob 7-connecting rod head and of shaft-support bushing according to a technique normally employed in this field.

Figure 6:
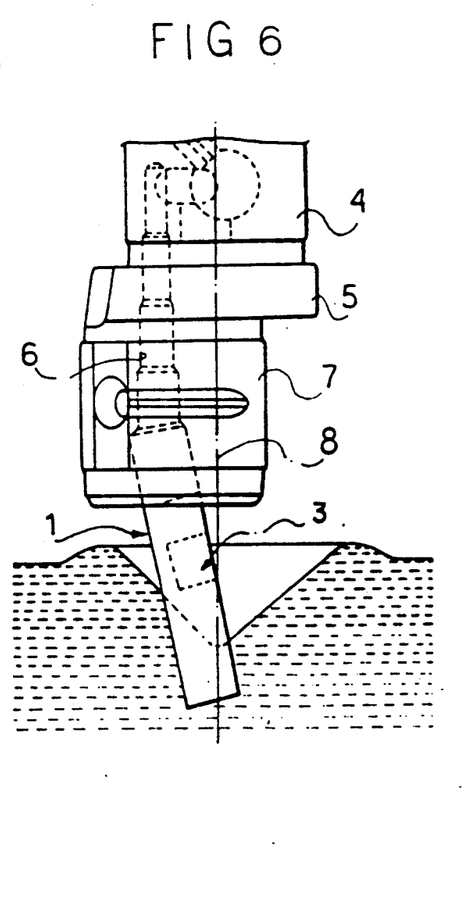
FIG. 6 is a view representing the operating of the invention.
Figure 7:
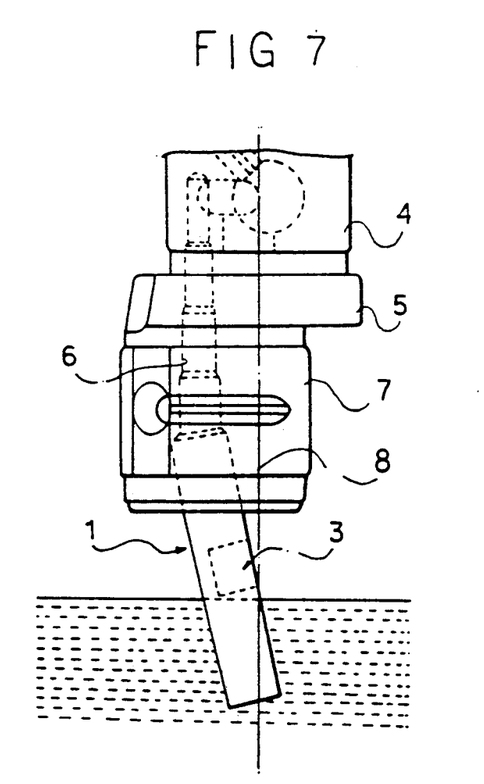
FIG. 7 is a view representing the non-operating condition of the invention.

Set on the lower part of the crankshaft knob 7, near the lower end of oil passage 6, is tube 1, whose lower part is immmersed in the lubricant (referring to FIG. 6 and 7).

Therefore, tube 1 rotates with its slanting axis around a vertical rotational axis 8 of shaft 4 owing to the rotation of motor shaft 4, and the particles of the lubricant contained in tube 1 will be accelerated upward, due to the effect of centrifugal force, along the inclined wall of tube 1.

Figure 8:
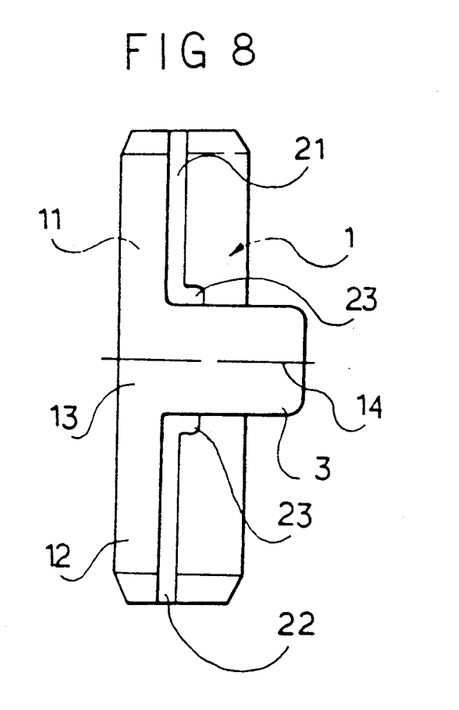
FIG. 8 is a detail view of the tube of FIG. 6
Figure 9:
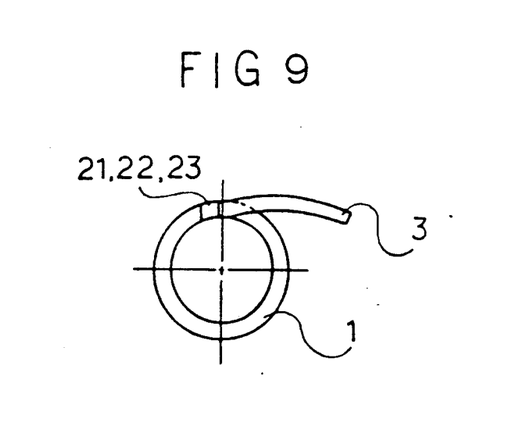
FIG. 9 is a cross-sectional view representing the lower part of the tube according to the invention.

Tube 1, as illustrated in FIG. 8 consists of a circular section extended through its full length with two types of fissures 21, 22, 23, which are formed at its longitudinal axis. Fissure 21 formed on the upper part of tube 1 is the same size as that of fissure 22 on the lower part of tube 1 and fissure 23 at the middle of tube 1 is formed relatively larger than fissures 21, 22. Vane portion 3 described below again is formed to cover fissure 23 spaced away therefrom, so that the discharging flow of the refrigerating gas is interrupted. Thus, it is noted that fissure 23 must be widen to emit an amount of the refrigerating gas same to that emitted from each of fissure 21 and fissure 22, and according to the embodiment of the invention the emitting of the refrigerating gas is accomplished with effect, when the size of fissures formed on tube 1 are within the scope of 0.5–1.5 mm.

Also, it is noted that the size of fissure 21 formed on the lower part of tube 1 is set to block the introduction of the bubbles generated owing to the rotation of tube 1, so that a predetermined uniform amount of the refrigerating gas is emitted through each of fissures 21, 22, 23 to enhance the velocity of the oil pumping.

Furthermore, tube 1 is provided with vane portion 3 mounted at the central portion of the longitudinal length of which middle portion 13 is positioned, in which the width of vane portion 3 is divided by half bounding line 14 formed across at the center of middle portion 13. Herein, it is noted that vane portion 3 is positioned over the lubricant to minimize the formation of bubbles owing to the rotation of tube 1, thereby enhancing the pumping effect. The position of vane portion 3 spaced away from fissure 23 of tube 1 to cover them blocks the upwardly movement of the lubricant along the peripheral wall of tube 1, so that it prevents the generating of the noise contrary to the prior art when drops of the lubricant accelerated upward over knob 7 by the centrifugal force fall.

What is claimed is:

1. An oil pickup structure of a compressor provided with a lubricating device including a tube for transporting a lubricant therethrough, having a first end for connection to a crankshaft and a second end for immersion into a lubricant, the central axis of the tube being positioned at an angle with respect to the rotational axis of the crankshaft, the improvement comprising:
   a first opening in the wall of said tube between said first and second ends;
   a second opening extending from said first end to said first opening;
   a third opening extending from said second end to said first opening; and
   a vane projecting from said tube and extending over said first opening;
   wherein said tube has a uniform interior passage throughout its length.

2. The oil pickup structure of claim 1, wherein:
   said second and third openings are elongated in the axial direction of said tube and aligned parallel to said central axis.

3. The oil pickup structure of claim 1, wherein:
   said second and third openings are of substantially the same dimension.

4. The oil pickup structure of claim 1, wherein:
   said second and third openings have a width between 0.5 and 1.5 mm.

5. The oil pickup structure of claim 1, wherein:
   said vane includes a portion for blocking travel of lubricant along an exterior of said tube.

6. An oil pickup structure of a compressor provided with a lubricating device, said device including a tube for transporting a lubricant therethrough, said tube having a first end for connection to a crankshaft, a second end for immersion into lubricant and a vane projecting from a middle portion of the tube, a central axis of said tube being positioned at an angle with respect to a rotational axis of the crankshaft, the improvement comprising:
   a lower opening extending in a predetermined uniform width from said second end of said tube to near a lower end of said vane;
   a top opening extending in said predetermined uniform width from said first end to near a top end of said vane;
   a middle opening extending in a relatively wider width than that of said top opening from a lower portion of said top opening to a top portion of said lower opening, wherein all center lines of said openings are on a center line of said tube; and
   said vane projecting at a predertermined distance away from said middle portion of said tube and crossing over said middle opening for preventing bubbles by said vane and equalizing refrigerating gas volumes passing in turn through said lower opening, said middle opening and said top opening.

7. The oil pickup structure of claim 6, wherein:
   said lower opening, said top opening and said middle opening are elongated in the axial direction of said tube and are aligned parallel to the central axis.

8. The oil pickup structure of claim 6, wherein:
   said tube has a uniform interior passage throughout its length.

9. The oil pickup structure of claim 6, wherein:
   said lower opening and said top opening have widths between 0.5 and 1.5 mm.

10. The oil pickup structure of claim 6, wherein:

said vane includes a portion for blocking travel of a lubricant along an exterior of said tube.

11. A process for lubricating parts of a compressor having an oil pickup device used in a condenser including a vertical shaft of said compressor, a crank shaft, a knob and an oil passage in said knob comprising a method of:

connecting a first end of a tube to said oil passage;

immersing a second end of said tube in a lubricant;

said tube having a first fissure of uniform width formed in a middle part of said tube;

said tube having a second fissure narrower than said first fissure and having a constant width, said second fissure formed in an upper part of said tube and connected to an upper part of said first fissure and extending to said first end of said tube;

said tube having a third fissure narrower than said first fissure and having a constant width, said third fissure formed in a lower part of said tube and connected to a lower part of said first fissure and extending to said second end of said tube;

said tube having a vane connected to said middle part of said tube and extending over said first fissure in a position spaced away from said first fissure; and rotating said vertical shaft to thereby rotate said tube in order to pick up said lubricant and thereby accelerate particles of said lubricant upward through said tube to effect pumping of said lubricant at a certain velocity to said parts of said compressor.

12. The process as claimed in claim 11, wherein said tube has an uniform interior passage throughout the length of the tube.

13. The process as claimed in claim 11, wherein said constant width of said second fissure is between 0.5 and 1.5 mm.

14. The process as claimed in claim 11, wherein said constant width of said third fissure is between 0.5 and 1.5 mm.

15. The process as claimed in claim 11, wherein said constant width of said second fissure and said constant width of said third fissure are equal.

16. The process as claimed in claim 15, wherein said equal constant widths are between 0.5 and 1.5 mm.

17. The process as claimed in claim 15, wherein said uniform width of said first fissure is formed so as to emit an amount of refrigerating gas trapped in said lubricant equal to an amount of refrigerating gas emitted from said second fissure and said third fissure.

18. The process as claimed in claim 15, wherein said vane blocks flow of the lubricant along said tube's peripheral wall and is positioned over said lubricant to minimize formation of bubbles in said lubricant as said tube rotates thereby enhancing said pumping effect.

19. The process as claimed in claim 18, wherein said third fissure blocks introduction of said bubbles into said tube so that uniform amounts of refrigerating gas trapped in said lubricant is emitted through said first, second and third fissures is uniform thereby enhancing the velocity of lubricant pumped.

* * * * *

UNITED STATES PATENT AND TRADEMARK OFFICE
CERTIFICATE OF CORRECTION

PATENT NO. : 5,088,579
DATED : 18 February 1992
INVENTOR(S) : Ki-Moon KIM & Gyu Dong KIM It is certified that error appears in the above-identified patent and that said Letters Patent is hereby corrected as shown below:

Column 1, Line 10, replace "slantly" with --obliquely--;

Line 24, replace "bending" with --bent--;

Line 29, replace "represents a" with --causing--;

Line 40, replace "3,858,658" with --3,858,685--;

Line 42, replace "a" (second occurrence) with --an--;

Line 43, delete "and" (first occurrence), and replace "A" with --a--;

Line 53, replace "intaken" with --taken in--;

Line 55, replace "into" with --part of--;

Line 57, replace "ad" with --and--, and delete "intaken";

Line 58, insert --taken in-- after "gas";

Line 62, replace "widen" with --widened--;

Line 63, delete "intaken", and insert --taken in-- after "gas";

Line 65, insert --in-- after "disadvantages", and replace "intaken" with --taken in--;

UNITED STATES PATENT AND TRADEMARK OFFICE
CERTIFICATE OF CORRECTION

PATENT NO. : 5,088,579
DATED : 18 February 1992
INVENTOR(S) : Ki-Moon Kim & Gyu Dong Kim It is certified that error appears in the above-identified patent and that said Letters Patent is hereby corrected as shown below:

Column 2, Line 8, insert --object of the present-- after "invention";

Line 9, replace "above" with --above-mentioned--;

Line 44, replace "no" with --not--;

Line 48, replace "doesn't" with --does not--;

Line 57, replace "accompany" with --accompanying--;

Line 58, replace "schematical" with --schematic--;

Line 66, replace "schematical" with --schematic--;

Column 3, Line 15, replace "to" (second occurrence) with --the--;

Line 30, replace "consists of" with --includes--;

Line 40, replace "widen" with --widened--;

Line 41, insert --the-- after "gas", and replace "to" with --as--, and replace "each of" with --both--;

Line 63, replace "upwardly" with --upward--;

UNITED STATES PATENT AND TRADEMARK OFFICE
CERTIFICATE OF CORRECTION

PATENT NO. : 5,088,579
DATED : February 18, 1992
INVENTOR(S) : Ki-Moon Kim, et. al.

It is certified that error appears in the above-indentified patent and that said Letters Patent is hereby corrected as shown below:

line 65, replace "generating" with --generation--, and delete "the" (second occurrence), and insert a comma after "art".

Signed and Sealed this

Ninth Day of November, 1993

Attest:

BRUCE LEHMAN

Attesting Officer

Commissioner of Patents and Trademarks